(12) United States Patent
Senyuta et al.

(10) Patent No.: US 10,023,472 B2
(45) Date of Patent: Jul. 17, 2018

(54) ALUMINUM OXIDE PRODUCTION METHOD

(71) Applicant: United Company RUSAL Engineering and Technology Centre LLC, g. Krasnoyarsk (RU)

(72) Inventors: Aleksandr Sergeevich Senyuta, St. Petersburg (RU); Andrey Vladimirovich Panov, St. Petersburg (RU); Andrey Andreevich Smirnov, Kirovo-Chepetsk (RU)

(73) Assignee: UNITED COMPANY RUSAL ENGINEERING AND TECHNOLOGY CENTRE LLC, Krasnoyarsk (RU)

( * ) Notice: Subject to any disclaimer, the term of this patent is extended or adjusted under 35 U.S.C. 154(b) by 0 days.

(21) Appl. No.: 14/765,695

(22) PCT Filed: Feb. 4, 2013

(86) PCT No.: PCT/RU2013/000077
§ 371 (c)(1),
(2) Date: Aug. 4, 2015

(87) PCT Pub. No.: WO2014/120036
PCT Pub. Date: Aug. 7, 2014

(65) Prior Publication Data
US 2015/0376021 A1    Dec. 31, 2015

(51) Int. Cl.
| | | |
|---|---|---|
| *C01F 7/00* | (2006.01) | |
| *C01F 7/30* | (2006.01) | |
| *C01F 7/34* | (2006.01) | |
| *C01F 7/44* | (2006.01) | |
| *B01J 20/08* | (2006.01) | |
| *B01J 20/30* | (2006.01) | |
| *B01J 21/04* | (2006.01) | |
| *B01J 37/00* | (2006.01) | |
| *B01J 37/06* | (2006.01) | |
| *B01J 37/08* | (2006.01) | |
| *B01J 35/04* | (2006.01) | |
| *B01J 35/10* | (2006.01) | |
| *B01J 35/02* | (2006.01) | |

(52) U.S. Cl.
CPC ............. *C01F 7/306* (2013.01); *B01J 20/08* (2013.01); *B01J 20/3071* (2013.01); *B01J 20/3078* (2013.01); *B01J 20/3085* (2013.01); *B01J 21/04* (2013.01); *B01J 35/04* (2013.01); *B01J 35/1019* (2013.01); *B01J 35/1042* (2013.01); *B01J 37/0072* (2013.01); *B01J 37/06* (2013.01); *B01J 37/08* (2013.01); *C01F 7/34* (2013.01); *C01F 7/441* (2013.01); *B01J 35/023* (2013.01); *C01P 2004/03* (2013.01); *C01P 2004/50* (2013.01); *C01P 2006/14* (2013.01); *C01P 2006/16* (2013.01); *C01P 2006/80* (2013.01)

(58) Field of Classification Search
CPC .. C01F 7/441; B01J 37/06; B01J 37/08; B01J 20/08; B01J 20/3071; B01J 20/3078; B01J 20/3085; B01J 21/04
USPC ................... 423/628, 625, 111, 631
See application file for complete search history.

(56) References Cited

U.S. PATENT DOCUMENTS

| | | | | |
|---|---|---|---|---|
| 2,590,833 A | * | 4/1952 | Bechtold ............... | C01F 7/34 423/631 |
| 2,663,620 A | * | 12/1953 | Haensel ............... | C01F 7/34 423/629 |
| 2,894,915 A | * | 7/1959 | Keith ............... | B01J 21/04 423/628 |

(Continued)

FOREIGN PATENT DOCUMENTS

| | | | |
|---|---|---|---|
| CN | 1752008 | * | 3/2006 |
| CN | 102502739 | * | 6/2012 |

(Continued)

OTHER PUBLICATIONS

Translation of CN 102502739, Jun. 2012.*
Machine translation of Chinese Office action corresponding to CN application 201380075218.7, dated Jan. 17, 2018.*
Ma et al., "Synthesis of macro-mesoporous alumina with yeast cell as bio-template," Microporous and Mesaporous Materials 165 (2013), pp. 177-184, 2012.
Chinese Office Action corresponding to Chinese Application No. 201380075218.7 dated Jan. 17, 2018.
Ren et al., "Microwave-Assisted Preparation of Hierarchical Mesoporous-Macroporous Boehmite AlOOH and y-Al2O3," Langmuir 2004, vol. 20, pp. 1531-1534.

*Primary Examiner* — Steven J Bos
(74) *Attorney, Agent, or Firm* — Hogan Lovells US LLP

(57) ABSTRACT

The invention pertains to methods of producing aluminum trioxide in the form of powders or agglomerations with particles having a porous honeycomb structure, which can be used as catalyst substrates, adsorbents and filters for the chemical, food, and pharmaceutical industry. The method of production of aluminum oxide in the form of powders or agglomerations with particles having a porous honeycomb structure involves the treatment of the aluminum salt with a solution of an alkaline reagent, washing of the sediment and thermal treatment thereof. The technical result of the invention is the production of aluminum oxide in the form of separate particles with given structure and properties, specifically, with particle porosity of 60-80% and a porous structure represented by extensive parallel channels with near hexagonal packing, with dimension of the channels at the diameter of 0.3 to 1.0 micron and length up to 50 microns. For this, the aluminum salt used is crystals of aluminum chloride hexahydrate, which are treated with an excess aqueous solution of ammonia at temperature of 20-80° C. to form boehmite, and the heat treatment is done at 450-650° C. until aluminum oxide is formed.

3 Claims, 2 Drawing Sheets

(56) References Cited

U.S. PATENT DOCUMENTS

Figure 1:
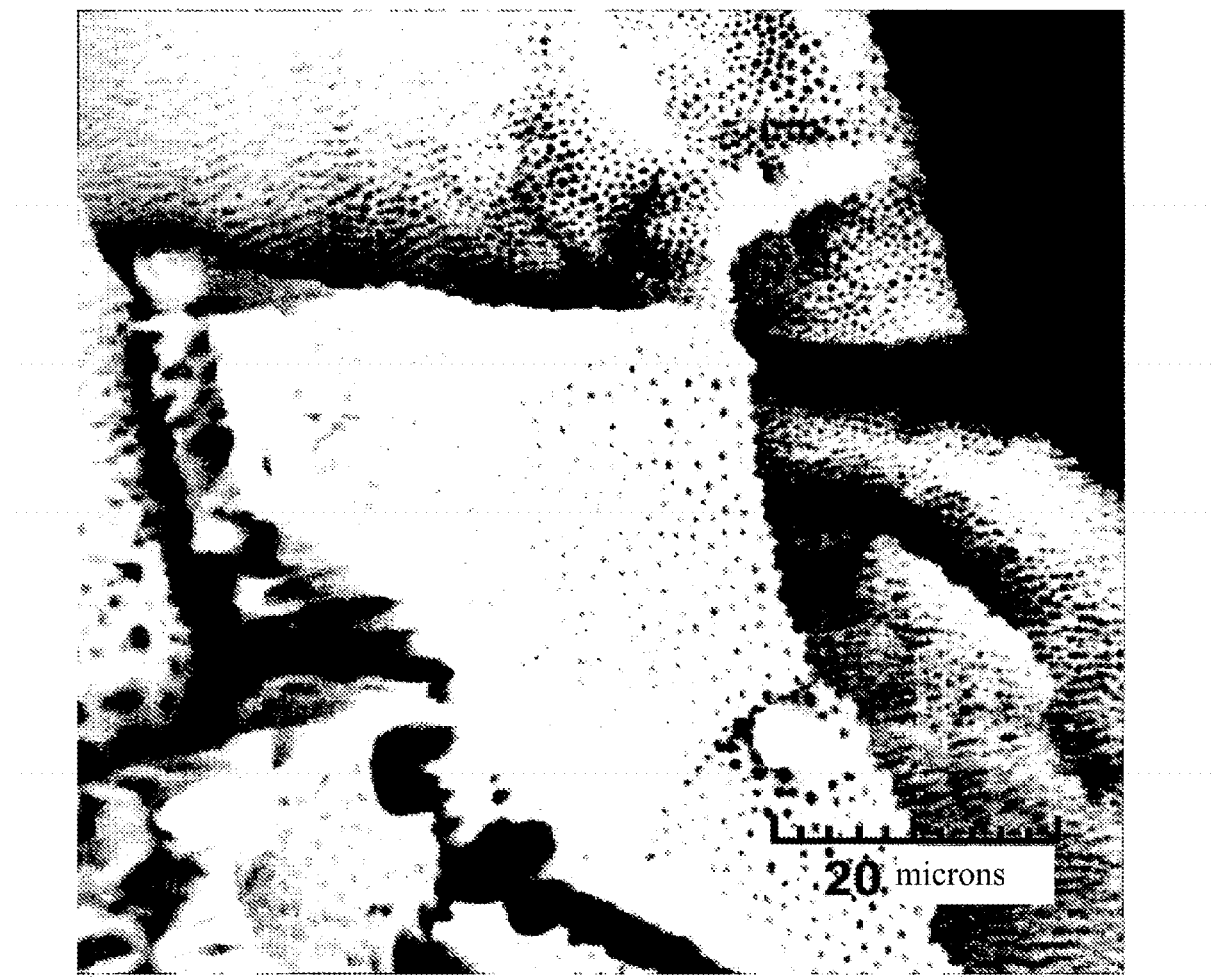

| | | | | |
|---|---|---|---|---|
| 3,188,174 A * | 6/1965 | Kehl | ............... | B01J 21/04 208/209 |
| 3,193,348 A * | 7/1965 | Mooi | ............... | B01J 21/04 208/123 |
| 4,018,881 A * | 4/1977 | Mattox | ............... | B01J 21/04 423/631 |
| 6,589,908 B1 * | 7/2003 | Ginestra | ............... | B01J 21/04 423/625 |
| 7,981,375 B2 * | 7/2011 | Ramberg | ............... | B01D 53/02 264/628 |
| 9,314,769 B2 * | 4/2016 | Parmentier | ............ | B01J 20/283 |
| 2003/0113538 A1 * | 6/2003 | Tom | ............... | B01J 20/08 428/402 |
| 2015/0175435 A1 * | 6/2015 | Senyuta | ............... | C01G 49/06 423/126 |

FOREIGN PATENT DOCUMENTS

| | | | |
|---|---|---|---|
| GB | 1081110 | * | 8/1967 |
| RU | 2258035 | | 2/2005 |
| WO | 2011-114017 | * | 9/2011 |

* cited by examiner

ALUMINUM OXIDE PRODUCTION METHOD

This application is a U.S. National Phase under 35 U.S.C. § 371 of International Application No. PCT/RU2013/000077, filed on Feb. 4, 2013. All publications, patents, patent applications, databases and other references cited in this application, all related applications referenced herein, and all references cited therein, are incorporated by reference in their entirety as if restated here in full and as if each individual publication, patent, patent application, database or other reference were specifically and individually indicated to be incorporated by reference.

The invention pertains to methods of producing aluminum trioxide in the form of powders or agglomerations with particles having a porous honeycomb structure, which can be used as catalyst substrates, adsorbents and filters for the chemical, food, and pharmaceutical industry.

There is a known method of producing macro-mesoporous aluminum oxide, consisting in the precipitation of aluminum hydroxide from a solution of aluminum nitrate by the action of triethanolamine, being a weak base, in the presence of yeast, separation and washing of the sediment, drying and roasting. (Yuan Ma, Qinglian Wei, Ruowen Ling, Fengkai An, Guangyu Mu, Yongmin Huang. Synthesis of macro-mesoporous alumina with yeast cell as bio-template. Microporous and Mesoporous Materials 165 (2013), p. 177-184, 2012). The method is able to produce aluminum oxide with large pores of 1.5 to 3 micron in the form of a labyrinth, whose walls contain interconnected pores with dimensions of 3-4.5 nm.

The drawbacks of the given method include the fact that the resulting pores are situated in the form of a labyrinth, which results in high hydraulic resistance to the passage of gases and liquids through the particle during catalysis and adsorption. Furthermore, one can also count as drawbacks the complexity and lengthiness of the process of production of such aluminum oxide.

The closest to the proposed method is a method of producing active aluminum oxide consisting in the precipitation of aluminum hydroxide from a solution of basic aluminum sulfate and a processing of this (RU, patent No. 2258035, C01F7/02, published 27 Feb. 2005). The precipitation of aluminum hydroxide of pseudoboehmite structure is done in a continuous duty by an aqueous solution of ammonia—$NH_4OH$. The AlOOH sediment obtained under defined conditions: pH values of the reaction mixture, concentration and temperature regimes, time of agitation—is filtered off, subjected to autoclave treatment in low-concentration solutions of ammonia, and then filtered off, washed, dried and roasted at temperature of 500-550° C.

This method makes it possible to obtain aluminum oxide with a specific surface of 290 $m^2/g$, mean particle size of 45-50 microns, and total pore volume of 0.6 $m^3/g$.

The drawback of this method is the presence of a precipitation phase of solid aluminum hydroxide from solution, which is responsible for a narrow range of resulting particle sizes, and also the presence of an autoclave treatment, which makes the process more complicated and longer.

The invention is based of the problem of developing a method of producing aluminum oxide with a honeycomb pore structure in the micron range of sizes, having low hydraulic resistance and good capacity to absorb droplet moisture.

The technical result of the invention is the production of aluminum oxide in the form of separate particles with given structure and properties, specifically, with particle porosity of 60-80% and a porous structure represented by extensive parallel channels with near hexagonal packing, with dimension of the channels at the diameter of 0.3 to 1.0 micron and length up to 50 microns.

The aforementioned technical effect is accomplished in that, in the method of production of aluminum oxide in the form of powders or agglomerations with particles having a porous honeycomb structure, involving the treatment of the aluminum salt with a solution of an alkaline reagent, washing of the sediment and thermal treatment thereof, the aluminum salt used is crystals of aluminum chloride hexahydrate, which are treated with an excess aqueous solution of ammonia at temperature of 20-80° C. to form boehmite, and the heat treatment is done at 450-650° C. until aluminum oxide is formed.

Processing of the aluminum salt in the form of crystals of aluminum chloride hexahydrate with an excess aqueous solution of ammonia at temperature of 20-80° C. to form boehmite and heat treatment at 450-650° C. makes it possible to obtain aluminum oxide in the form of separate particles with particle porosity of 60-80% and porous structure in the form of extensive parallel channels with a near hexagonal packing, with particle dimension at the diameter of 0.3 to 1.0 micron and length up to 50 microns.

In such a method of production of aluminum oxide there is no reprecipitation of hydrated aluminum compounds. The dimension of the resulting particles and, consequently, the length of the pores are dictated solely by the initial dimension of the crystals of the starting substance, aluminum chloride hexahydrate.

The method for producing alumina is carried out as follows.

Crystals of aluminum chloride hexahydrate are treated with a stoichiometric excess of an aqueous ammonia solution (content of $NH_3$-25 wt. %) at a temperature of 20-80° C., which increases in the course of the process due to the exothermal effect of the reaction. The particles treated with the aqueous solution of ammonia visually preserve their external shape and the dimensions of the original crystals of aluminum chloride hexahydrate, but are constituted (according to X-ray phase analysis) of aluminum hydroxide in the polymorphic modification of boehmite (AlOOH). Thus, unlike the known methods, the aluminum hydroxide is obtained not by precipitation from aqueous solutions of aluminum salts, but by pseudomorphosis.

The obtained boehmite particles are washed with water until the medium is neutral, and subjected to heat treatment at temperature of 450-650° C. for 1 hour, forming aluminum oxide.

Figure 2:

The surface morphology and cleavage of the particles of aluminum oxide according to the results of scanning electron microscopy are presented in FIGS. 1 and 2, respectively.

The particles of the resulting aluminum oxide are pierced by extended parallel channels (pores) whose openings emerge onto the outer surface. The dimensions of the channels are diameter of 0.3-1.0 micron and length up to 50 microns. The porosity of the particles, determined mathematically on the basis of measurement of micrographs, is 60-80%. The aluminum oxide contains, in wt. %: $Al_2O_3$ 98.6; $Na_2O$ 0.005; $Fe_2O_3$ 0.01; $SiO_2$ 0.01; $Cl^-$<0.01 and has a gamma polymorphic modification, providing the highest sorptional properties of the product.

In such a method of production of aluminum oxide there is no reprecipitation of hydrated aluminum compounds. Thus, the dimension of the resulting particles and, consequently, the length of the pores are dictated solely by the initial dimension of the crystals of the starting substance, aluminum chloride hexahydrate.

Unlike the closest prior art and other known aluminum oxides with developed porous structure, the production of the proposed aluminum oxide is distinguished by exceptional simplicity.

What is claimed is:

1. A method of producing aluminum oxide in the form of powders or agglomerates having a porous honeycomb structure, the method comprising the steps of:
    treating an aluminum salt with an excess of a solution of an alkaline reagent at a temperature of 20-80° C. to form a sediment comprising boehmite, wherein the aluminum salt used comprises crystals of aluminum chloride hexahydrate and the solution of an alkaline reagent comprises an aqueous solution of ammonia;
    washing the sediment to form washed sediment; and
    thermally treating the washed sediment at 450-650° C. until aluminum oxide is formed.

2. The method of producing aluminum oxide of claim 1, wherein the aluminum oxide exhibits a porosity of 60-80%.

3. The method of producing aluminum oxide of claim 1, wherein the porous honeycomb structure of the aluminum oxide exhibits parallel channels with near hexagonal packing, wherein the channels each have diameters of 0.3 to 1.0 microns and lengths up to 50 microns.

* * * * *